(12) United States Patent
Falcone

(10) Patent No.: US 12,373,035 B1
(45) Date of Patent: Jul. 29, 2025

(54) WEARABLE HAPTIC FEEDBACK APPARATUS AND SYSTEM

(71) Applicant: Jack Ezekiel Falcone, Martinsville, NJ (US)

(72) Inventor: Jack Ezekiel Falcone, Martinsville, NJ (US)

( * ) Notice: Subject to any disclaimer, the term of this patent is extended or adjusted under 35 U.S.C. 154(b) by 0 days.

(21) Appl. No.: 19/018,356

(22) Filed: Jan. 13, 2025

(51) Int. Cl.
　*G06F 3/01* (2006.01)
　*G06F 1/16* (2006.01)
　*G06F 3/16* (2006.01)

(52) U.S. Cl.
　CPC .............. *G06F 3/016* (2013.01); *G06F 1/163* (2013.01); *G06F 3/16* (2013.01)

(58) Field of Classification Search
　CPC .............. G06F 3/016; G06F 1/163; G06F 3/16
　See application file for complete search history.

(56) References Cited

U.S. PATENT DOCUMENTS

| | | | |
|---|---|---|---|
| 5,166,463 A | 11/1992 | Weber | |
| 7,842,879 B1 | 11/2010 | Carter | |
| 10,121,388 B2 * | 11/2018 | Seim | G09B 21/003 |
| 2018/0315343 A1 | 11/2018 | Shvartzberg et al. | |
| 2023/0343310 A1 * | 10/2023 | Seim | G09B 15/00 |

OTHER PUBLICATIONS

SenseGlove Nova. 3 pages. Viewed online Jan. 12, 2025 at https://www.senseglove.com/product/nova/.SenseGlove, Rotterdam, NL.

\* cited by examiner

*Primary Examiner* — Quan Zhen Wang
*Assistant Examiner* — Mancil Littlejohn, Jr.
(74) *Attorney, Agent, or Firm* — Gregory Finch; Finch Paolino, LLC

(57) ABSTRACT

A wearable haptic feedback apparatus and system for deaf and hard of hearing persons comprising a wearable garment, an acoustic sensing means, and one or more haptic output means. In accordance with certain embodiments, the wearable haptic feedback apparatus and system is configured to process an audio input comprising a musical composition in real-time to generate a series of haptic outputs (e.g., at a body part of a user) according to the musical notes and/or rhythm of the musical composition.

20 Claims, 10 Drawing Sheets

Note B

Vibration Pattern 2

Note D

Vibration Pattern 4

Note A

Vibration Pattern 1

Note C

Vibration Pattern 3

WEARABLE HAPTIC FEEDBACK APPARATUS AND SYSTEM

FIELD

The present disclosure relates to the field of haptic feedback devices for deaf persons; in particular, a wearable garment comprising an acoustic sensor, and a haptic output means configured to output vibrational patterns according to musical notes received by the acoustic sensor.

BACKGROUND

Music plays a fundamental role in human culture, emotion, and communication, offering significant aesthetic and emotional experiences. However, individuals who are deaf or hard of hearing are often unable to perceive the auditory aspects of music, limiting their ability to fully experience this form of artistic expression. Despite advances in accessibility technologies, there remains a gap in providing solutions that enable these individuals to sense and appreciate the nuances of music in a meaningful way.

Current approaches to addressing this challenge include visual representations of music, such as light shows synchronized with audio signals, or devices that amplify low-frequency sounds. While these methods provide some degree of sensory input, they fail to capture the richness and complexity of musical elements, such as rhythm, melody, and harmony. Additionally, these solutions often do not allow for a personal and immersive experience tailored to the user.

Haptic feedback technology has emerged as a promising tool for enhancing sensory experiences by translating audio signals into tactile sensations. By leveraging haptic feedback, it is possible to convey the rhythm, pitch, and dynamics of music through vibrations and tactile stimuli. However, existing haptic devices lack the precision, scalability, and user-centric design necessary to effectively communicate complex musical compositions to individuals with hearing impairments.

Through applied effort, ingenuity, and innovation, Applicant has identified a number of deficiencies and problems with haptic feedback devices for deaf or hard of hearing persons. Applicant has developed a solution that is embodied by the present invention, which is described in detail below.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Certain aspects of the present disclosure provide for a wearable haptic feedback apparatus comprising a supporting structure (e.g., a garment or other wearable article) comprising a fabric material configured to be placed in proximity to (e.g., worn on) a body part of a user; a means for sensing an acoustic wave disposed on at least one surface of the supporting structure or embedded in the supporting structure; a controller communicably engaged with the means for sensing the acoustic wave via at least one bus, wherein the means for sensing the acoustic wave is configured to provide at least one signal to the controller in response to sensing one or more acoustic wave; a plurality of vibrational motors operably engaged with the controller, wherein each vibrational motor in the plurality of vibrational motors is disposed on at least one surface of the supporting structure or embedded in the supporting structure, wherein each vibrational motor in the plurality of vibrational motors is configured to generate a vibrational output in response to a control signal from the controller; and a power source operably engaged with the controller and the plurality of vibrational motors to provide a flow of power thereto.

In accordance with certain embodiments, the controller of the wearable haptic feedback apparatus may comprise a processor and a non-transitory computer readable medium having instructions stored thereon that, when executed by the processor, command the processor to perform one or more operations comprising operations for processing the at least one signal to identify one or more musical notes. In certain embodiments, the one or more operations may further comprise operations for commanding at least one vibrational motor in the plurality of vibrational motors to generate the vibrational output in response to identifying the one or more musical notes. In certain embodiments, the one or more operations may further comprise operations for commanding the at least one vibrational motor in the plurality of vibrational motors to generate the vibrational output according to at least one vibrational output pattern. In certain embodiments, the at least one vibrational output pattern may be selected from a plurality of vibrational output patterns. In certain embodiments, each vibrational output pattern in the plurality of vibrational output patterns may comprise a different pattern. In certain embodiments, each vibrational output pattern in the plurality of vibrational output patterns may correspond to a different note on a musical scale. In accordance with certain embodiments, each vibrational motor in the plurality of vibrational motors may be positioned at a different location on the supporting structure. In accordance with certain embodiments, the controller may be configured to command the at least one vibrational motor in the plurality of vibrational motors to generate the vibrational output in response to identifying the one or more musical notes in real-time.

Further aspects of the present disclosure provide for a haptic feedback apparatus comprising a supporting structure (e.g., a garment or other wearable article) configured to be placed in proximity to (e.g., worn on) a body part of a user; a means for sensing an acoustic wave disposed on at least one surface of the supporting structure or embedded in the supporting structure; a controller communicably engaged with the means for sensing the acoustic wave, wherein the means for sensing the acoustic wave is configured to provide at least one signal to the controller in response to sensing one or more acoustic wave; a haptic feedback means operably engaged with the controller, wherein the haptic feedback means is configured to generate a haptic output at one or more locations of the body part of the user in response to the one or more acoustic wave; and a power source operably engaged with the controller and the haptic feedback means to provide a flow of power thereto.

In accordance with certain embodiments, the controller is configured to process the at least one signal to identify one or more musical notes. In certain embodiments, the haptic feedback means is configured to generate the haptic output according to two or more different patterns. In accordance with said embodiments, the two or more different patterns may correspond to two or more different musical notes. In certain embodiments, the controller may be configured to command the haptic output means to generate the haptic output in real-time in response to identifying the one or more musical notes. In said embodiments, the controller may be configured to command the haptic output means to generate the haptic output according to the one or more musical notes.

Still further aspects of the present disclosure provide for a haptic feedback system comprising a supporting structure (e.g., a garment or other wearable article) comprising a fabric material configured to be placed in proximity to (e.g., worn on) a body part of a user, wherein the supporting structure comprises: a means for sensing an acoustic wave disposed on at least one surface of the supporting structure or embedded in the supporting structure; a controller communicably engaged with the means for sensing the acoustic wave via at least one bus, wherein the means for sensing the acoustic wave is configured to provide at least one signal to the controller in response to sensing one or more acoustic waves; and a plurality of vibrational motors operably engaged with the controller, wherein each vibrational motor in the plurality of vibrational motors is configured to generate a vibrational output in response to a control signal from the controller; and a computing device communicably engaged with the controller via a data transfer interface, wherein the computing device is configured to command one or more operations of the controller.

In accordance with certain embodiments, the controller of the wearable haptic feedback apparatus may comprise a processor and a non-transitory computer readable medium having instructions stored thereon that, when executed by the processor, command the processor to perform one or more operations, wherein the one or more operations comprise processing the at least one signal to identify one or more musical notes. In certain embodiments, the one or more operations further comprise commanding at least one vibrational motor in the plurality of vibrational motors to generate the vibrational output in response to identifying the one or more musical notes. In certain embodiments, the one or more operations further comprise commanding the at least one vibrational motor in the plurality of vibrational motors to generate the vibrational output according to at least one vibrational output pattern. In certain embodiments, the at least one vibrational output pattern may be selected from a plurality of vibrational output patterns. In certain embodiments, each vibrational output pattern in the plurality of vibrational output patterns corresponds to a different note on a musical scale.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF DRAWINGS

The skilled artisan will understand that the figures, described herein, are for illustration purposes only. It is to be understood that in some instances various aspects of the described implementations may be shown exaggerated or enlarged to facilitate an understanding of the described implementations. In the drawings, like reference characters generally refer to like features, functionally similar and/or structurally similar elements throughout the various drawings. The drawings are not necessarily to scale, emphasis instead being placed upon illustrating the principles of the teachings. The drawings are not intended to limit the scope of the present teachings in any way. The apparatus and system may be better understood from the following illustrative description with reference to the following drawings in which.

DETAILED DESCRIPTION

Figure 1:
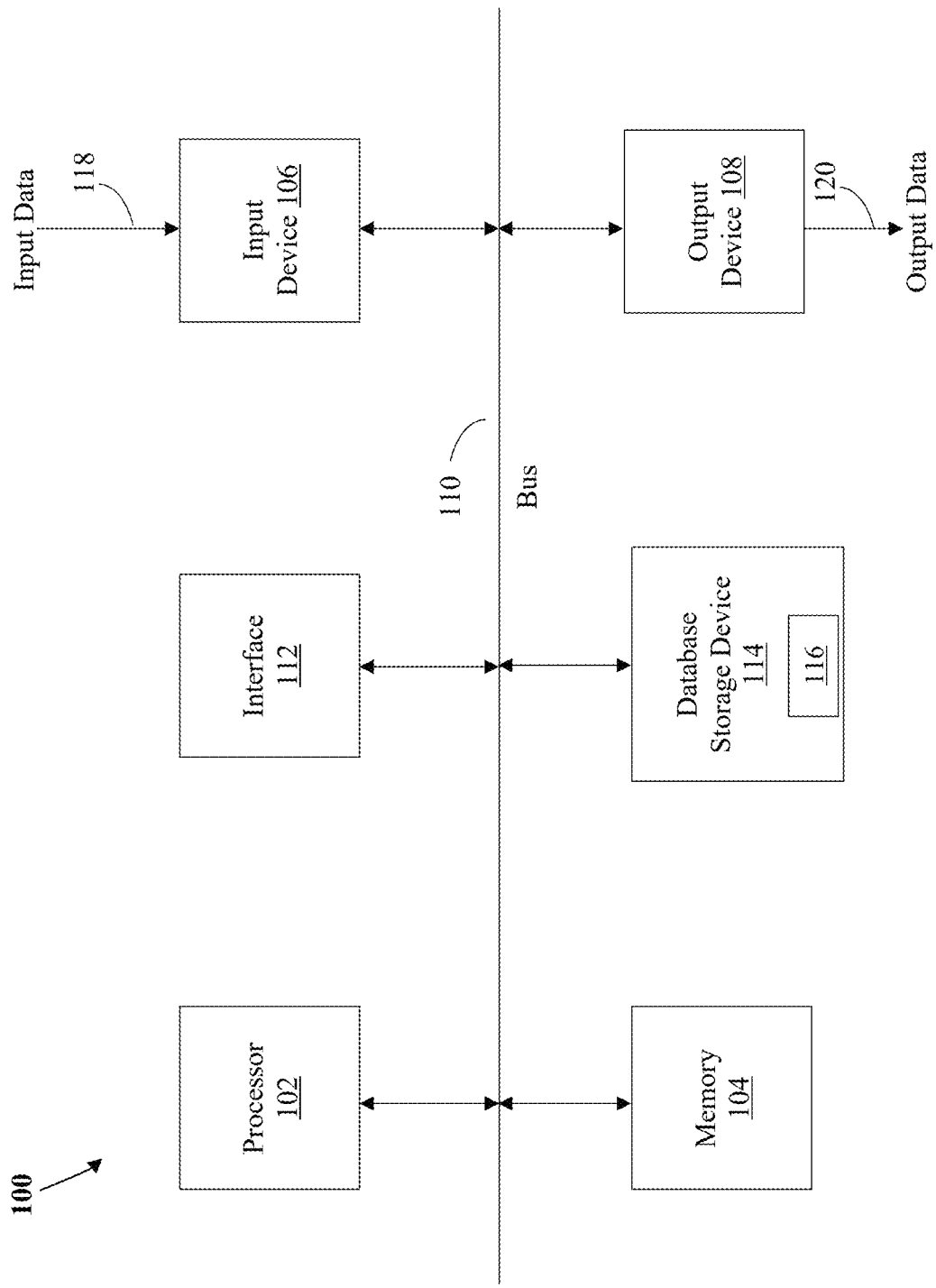
FIG. 1 is an illustrative embodiment of a computing device through which one or more aspects of the present disclosure may be implemented.

It should be appreciated that all combinations of the concepts discussed in greater detail below (provided such concepts are not mutually inconsistent) are contemplated as being part of the inventive subject matter disclosed herein. It also should be appreciated that terminology explicitly employed herein that also may appear in any disclosure incorporated by reference should be accorded a meaning most consistent with the particular concepts disclosed herein.

Following below are more detailed descriptions of various concepts related to, and embodiments of, inventive methods, apparatus and systems configured to enable deaf and hard of hearing persons to experience music through an immersive, haptic feedback experience. Certain aspects of the present disclosure provide for a wearable garment (e.g., a glove) that comprises a means for sensing an acoustic input (i.e., an acoustic transducer), a controller for processing a sensor input, and at least one haptic feedback means embedded in or coupled to the wearable garment that is configured to provide a vibrational output (e.g., at a surface of the user's skin) in response to one or more control signals from the controller. In accordance with certain aspects of the present disclosure, one or more characteristics of the vibrational output are configured according to the notes and/or rhythm of a musical composition.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. The present disclosure should in no way be limited to the exemplary implementation and techniques illustrated in the drawings and described below.

Before the present invention and specific exemplary embodiments of the invention are described, it is to be understood that this invention is not limited to the particular embodiments described, and as such may vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed by the invention. The upper and lower limits of these smaller ranges may independently be included in the smaller ranges, and are also encompassed by the invention, subject to any specifically excluded limit in a stated range. Where a stated range includes one or both of the endpoint limits, ranges excluding either or both of those included endpoints are also included in the scope of the invention.

As used herein, "exemplary" means serving as an example or illustration and does not necessarily denote ideal or best.

As used herein, the term "includes" means includes but is not limited to, the term "including" means including but not limited to. The term "based on" means based at least in part on.

As used herein, the term "interface" refers to any shared boundary across which two or more separate components of a computer system may exchange information. The exchange can be between software, computer hardware, peripheral devices, humans, and combinations thereof.

An exemplary system, method, and apparatus according to the principles herein may include an apparatus comprising a wearable garment, at least one acoustic sensor, a controller, and at least one vibrational motor configured to generate a plurality of vibrational output patterns corresponding to a musical composition.

In accordance with an exemplary use case provided by embodiments of the present disclosure, a deaf or hard of hearing person may experience a musical composition via a haptic output (e.g., vibration) of a wearable garment comprising at least one acoustic sensor, a controller, and at least one vibrational motor configured to generate a plurality of vibrational output patterns corresponding to the notes and/or rhythm of the musical composition.

Certain benefits and advantages of the present disclosure include an apparatus to enable deaf or hard of hearing persons to experience a musical composition by translating one or more aspects of the musical composition into a haptic modality (e.g., a vibrational output).

Turning now descriptively to the drawings, in which similar reference characters denote similar elements throughout the several views, FIG. 1 depicts an exemplary computing system in which certain illustrated embodiments of the present invention may be implemented.

Referring now to FIG. 1, a processor-implemented computing system 100 through which one or more aspects of the present disclosure may be implemented is shown. According to an embodiment, system 100 may generally comprise at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could comprise more than one distinct processing device, for example to handle different functions within system 100. Input device 106 receives input data 118 and can comprise, for example, a keyboard, a pointer device such as a pen-like device or a mouse, audio receiving device for voice-controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can comprise, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, system 100 is adapted to allow data or information to be stored in and/or retrieved from, via wired or wireless communication means, at least one database 116. The interface 112 may allow wired and/or wireless communication between the processing unit 102 and peripheral components that may serve a specialized purpose. In general, the processor 102 can receive instructions as input data 118 via input device 106 and can display processed results or other output to a user by utilizing output device 108. More than one input device 106 and/or output device 108 can be provided. It should be appreciated that system 100 may be any form of terminal, server, specialized hardware, or the like.

It is to be appreciated that system 100 may be a part of a networked communications system. System 100 could connect to a network, for example the Internet or a WAN. Input data 118 and output data 120 could be communicated to other devices via the network. The transfer of information and/or data over the network can be achieved using wired communications means or wireless communications means. A server can facilitate the transfer of data between the network and one or more databases. A server and one or more databases provide an example of an information source.

Thus, system 100 illustrated in FIG. 1 may operate in a networked environment using logical connections to one or more remote computers. The remote computer may be a personal computer, a server, a router, a network PC, a peer device, or other common network node, and typically includes many or all of the elements described above.

It is to be further appreciated that the logical connections depicted in FIG. 1 include a local area network (LAN) and a wide area network (WAN) but may also include other networks such as a personal area network (PAN). Such networking environments are commonplace in offices, enterprise-wide computer networks, intranets, and the Internet. For instance, when used in a LAN networking environment, system 100 is connected to the LAN through a network interface or adapter. When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to system 100, or portions thereof, may be stored in a remote memory storage device. It is to be appreciated that the illustrated network connections of FIG. 1 are exemplary and other means of establishing a communications link between multiple computers may be used.

FIG. 1 is intended to provide a brief, general description of an illustrative and/or suitable exemplary environment in which embodiments of the present disclosure may be implemented. FIG. 1 is an example of a suitable environment and is not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

In the description that follows, certain embodiments may be described with reference to acts and symbolic representations of operations that are performed by one or more computing devices, such as system 100 of FIG. 1. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments may be implemented with numerous other general-purpose or special-purpose computing devices and computing system environments or configurations. Examples of well-known computing systems, environments, and configurations that may be suitable for use with an embodiment include, but are not limited to, personal computers, handheld or laptop devices, personal digital assistants, multiprocessor systems, microprocessor-based systems, set top boxes, programmable consumer electronics, network, minicomputers, server computers, game server computers, web server computers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

With the exemplary computing system environment 100 of FIG. 1 being generally shown and discussed above, description will now turn towards illustrated embodiments of the present invention which generally relates to an apparatus and system for a wearable haptic feedback device for deaf and hard of hearing persons that are configured to process an audio input comprising a musical composition in real-time to generate a series of haptic outputs at a body part of a user according to the musical notes and/or rhythm of the musical composition.

Figure 2:
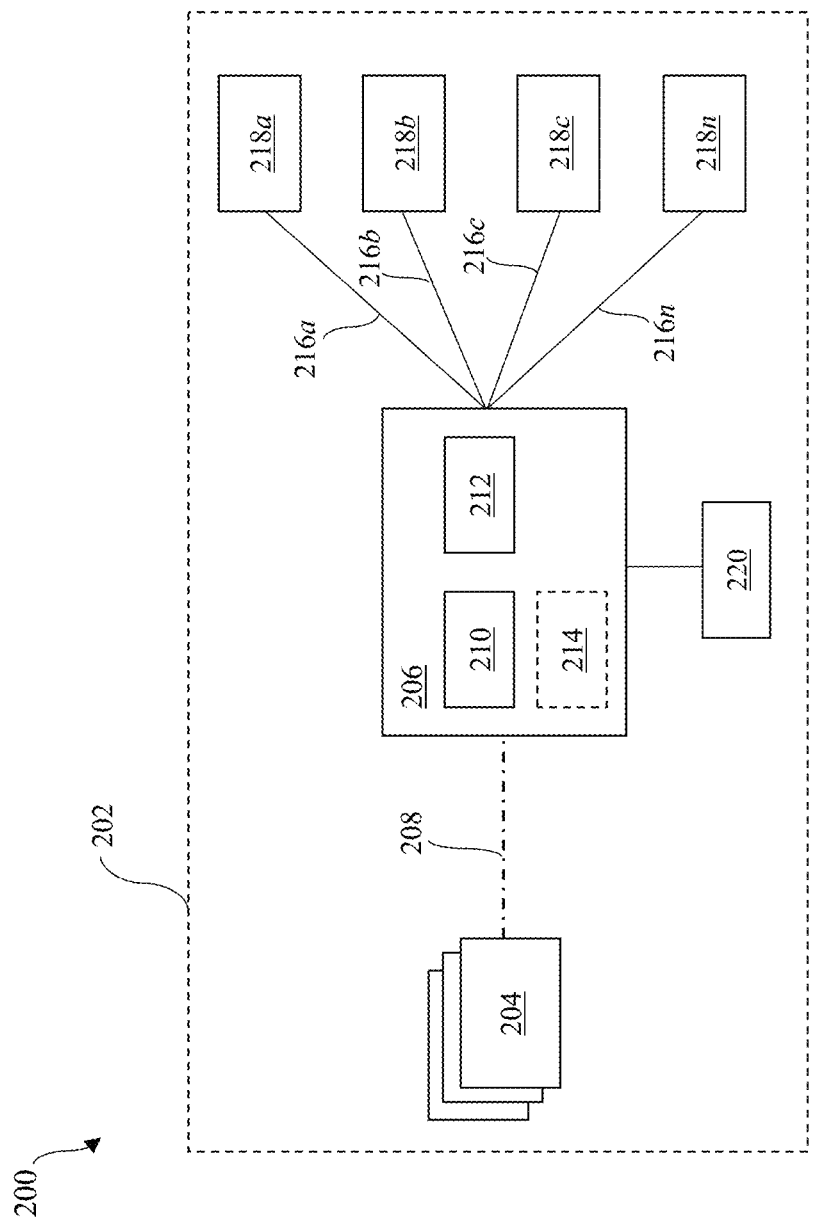
FIG. 2 is a block diagram of a wearable haptic feedback apparatus, in accordance with certain aspects of the present disclosure.

Referring now to FIG. 2, a block diagram of a wearable haptic feedback apparatus 200 is shown. In accordance with certain aspects of the present disclosure, apparatus 200 comprises a wearable garment 202. In certain embodiments, wearable garment 202 comprises a glove configured to be worn on the hand of a user of apparatus 200. In alternative embodiments, wearable garment 202 may be configured as a variety of types of garments, including a sleeve, a vest, a hat, a headband, a wristband, and the like. Wearable garment 202 may be made of a stretchable, form-fitting material, such as spandex or neoprene, to enable a skin-tight fit on the user's hand (or other body part). Apparatus 200 may further comprise at least one acoustic sensing means 204, a controller 206, a plurality of vibrational motors 218*a-n* and a battery 220. In accordance with certain embodiments, acoustic sensing means 204 may comprise one or more acoustic transducers (e.g., microphones) configured to convert one or more arriving acoustic waves into an electrical signal. In certain embodiments, acoustic sensing means 204 may comprise a piezoelectric acoustic material disposed on one or more surfaces of wearable garment 202. In accordance with certain aspects of the present disclosure, acoustic sensing means 204 is communicably engaged with controller 206 via at least one bus 208. Bus 208 is configured to communicate electrical signals generated by acoustic sensing means 204 to controller 206 as a plurality of sensor inputs. Controller 206 may comprise at least one processor 210, memory device 212 and, optionally, at least one data transfer interface 214. In certain embodiments, data transfer interface 214 may comprise a wireless communication chipset (e.g. BLUETOOTH antenna) configured to establish a wireless data transfer interface between apparatus 200 and a computing device (e.g., a smartphone). Processor 210 may comprise a processing unit (e.g., as described in FIG. 1) configured to command one or more operations of controller 206. Memory device 212 may comprise a non-transitory computer-readable storage medium (e.g., as described in FIG. 1) comprising a plurality of processor-executable instructions stored thereon, wherein the processor-executable instructions are configured to command one or more operations of the processor. The plurality of vibrational motors 218a-n may be operably engaged with controller 206 via a plurality of conductive wires 216a-n. In accordance with certain aspects of the present disclosure, controller 206 is configured to engage the plurality of vibrational motors 218a-n to vibrate according to one or more pattern, sequence, intensity and duration. In certain alternative embodiments, the plurality of vibrational motors 218a-n may be replaced with an alternative haptic feedback means, such as a force feedback means, electro-tactile feedback means, an ultrasonic feedback means and the like. Battery 220 is configured to deliver a flow of power between controller 206 and the plurality of vibrational motors 218a-n.

Figure 3:
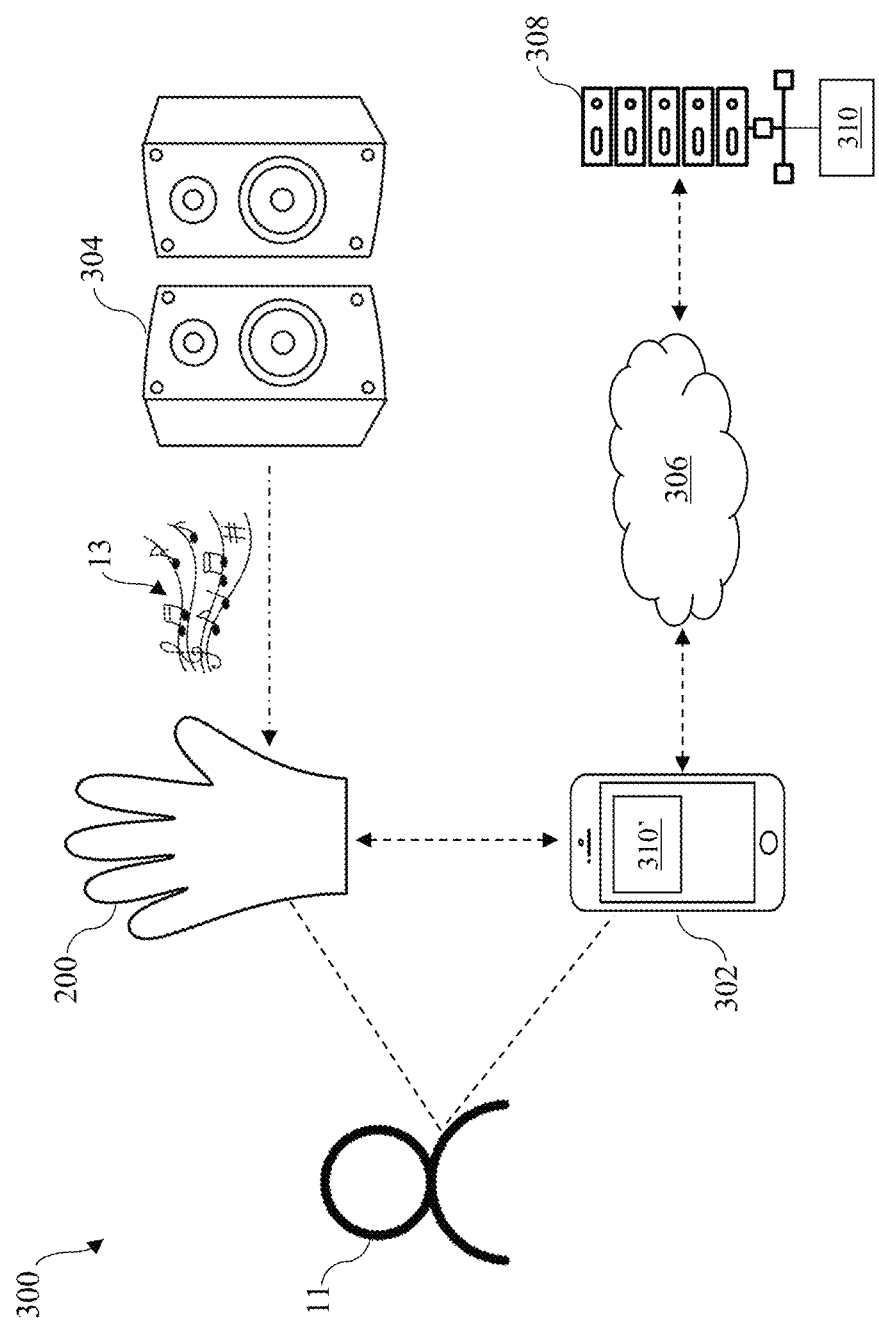
FIG. 3 is an architecture diagram of a wearable haptic feedback system, in accordance with certain aspects of the present disclosure.

Referring now to FIG. 3, an architecture diagram of a wearable haptic feedback system 300 is shown. In accordance with certain aspects of the present disclosure, system 300 may comprise apparatus 200 (as shown and described in association with FIG. 2). In certain embodiments, system 300 may include a computing device 302. Computing device 302 may include a personal computing device, such as a smartphone or tablet computer. Computing device 302 may be communicably engaged with an application server 308 via a communications network 306 (e.g., Internet network). In certain embodiments, application server 308 may comprise an end user application 310 hosted thereon. End user application 310 may comprise a plurality of application protocols configured to command one or more operations of apparatus 200 and/or perform one or more audio processing operations for the purpose of configuring one or more haptic output sequences for apparatus 200. In certain embodiments, computing device 302 may be configured to execute an end user instance 310' of end user application 310. End user instance 310' may comprise a native or Web-based mobile application. End user instance 310' may comprise a graphical user interface configured to enable an end user 11 to establish a wireless data transfer interface between computing device 302 and apparatus 200 and command one or more operations of apparatus 200. In accordance with certain aspects of the present disclosure, apparatus 200 may be configured as a stand-alone device without any communications functionality between connected devices.

In accordance with certain aspects of the present disclosure, system 300 is configured to process an acoustic input in order to command apparatus 200 to deliver a haptic output to a body part of user 11. In accordance with certain aspects of the present disclosure, a loudspeaker 304 (or other audio source, including live audio) is configured to output an acoustic output 13 comprising a musical composition. The musical composition may comprise a "traditional" musical composition including musical notes (i.e., the twelve musical notes, A through G), rhythm, tempo, etc.

In accordance with certain aspects of the present disclosure, the acoustic waves generated by acoustic output 13 arrive at a surface of apparatus 200. As described in FIG. 2, apparatus 200 is configured to convert the arriving acoustic waves to electrical signals via at least one acoustic sensing means (e.g., acoustic sensing means 204 as shown in described in FIG. 2). In accordance with certain aspects of the present disclosure, system 300 is configured to process the electrical signals generated by the at least one acoustic sensing means to extract a plurality of characteristics of the musical composition (e.g., musical notes, beat/rhythm, etc.). In certain embodiments, the processing operations may be executed at a controller of apparatus 200. In other embodiments, the processing operations may be executed at computing device 302 and/or application server 308. In certain embodiments, the processing operations may be executed via a combination of one or more of the controller of apparatus 200, at computing device 302 and application server 308. The processing operations may be executed in real-time.

In accordance with certain aspects of the present disclosure, system 300 is configured to configure a haptic output means of apparatus 200 (e.g., the plurality of vibrational motors 218a-n as shown and described in FIG. 2) to generate a haptic output at a body surface of user 11 (e.g., the user's hand). In accordance with certain embodiments, system 300 is configured to configure the haptic output means of apparatus 200 to generate a haptic output according to one or more pattern, sequence, intensity and duration. In accordance with certain aspects of the present disclosure, the one or more pattern, sequence, intensity and duration of the haptic output means of apparatus 200 is configured according to the plurality of characteristics of the musical composition (e.g., musical notes, beat/rhythm, etc.). For example, if the musical composition comprises a sequence of chords "G-C-D," then the haptic output means may be configured to generate a first haptic output according to a first pattern associated with the "G" chord, a second haptic output according to a second pattern associated with the "C" chord, and a third haptic output according to a third pattern associated with the "D" chord. Additionally, if the musical composition is such that the "G" chord is played for four beats, the "C" chord is played for four beats, and the "D" chord is played for eight beats, then system 300 is configured to generate the first haptic output according to the first pattern associated with the "G" chord for four beats, the second haptic output according to the second pattern associated with the "C" chord for four beats, and the third haptic output according to the third pattern associated with the "D" chord for eight beats. In this way, user 11 is able to experience the musical composition via a haptic feedback modality.

Figure 4A:
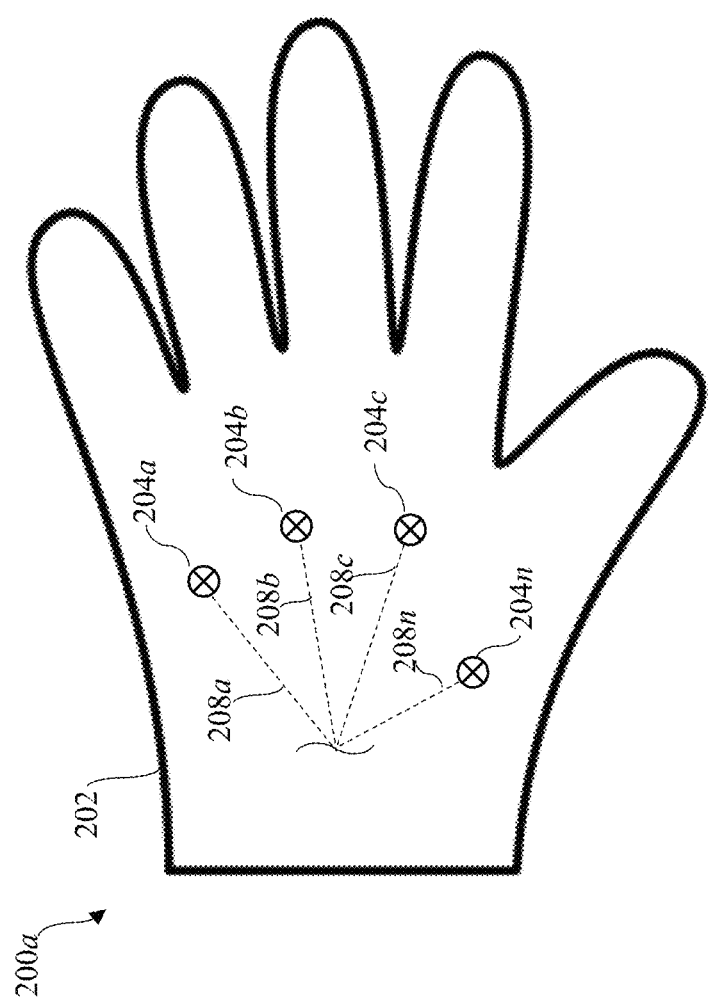
FIG. 4A is a plan view of a wearable haptic feedback apparatus, in accordance with certain aspects of the present disclosure.

Referring now to FIG. 4A, a plan view of a wearable haptic feedback apparatus 200a is shown. In accordance with certain aspects of the present disclosure, wearable haptic feedback apparatus 200a comprises an embodiment of wearable haptic feedback apparatus 200, as shown and described in FIG. 2. FIG. 4A illustrates a top-down plan view of apparatus 200a. In accordance with certain embodiments, apparatus 200a comprises a plurality of acoustic transducers 204a-n disposed on, or embedded within, a surface of wearable garment 202. As shown in FIG. 4A, wearable garment 202 is configured as a glove. In accordance with certain embodiments, each transducer in the plurality of acoustic transducers 204a-n is disposed at a different location on wearable garment 202. In accordance with certain aspects of the present disclosure, the plurality of acoustic transducers 204a-n may be configured as an array to provide audio signal inputs to the controller (not shown) of apparatus 200a. The plurality of acoustic transducers 204a-n may be communicably engaged with the controller (not shown) of apparatus 200a via a plurality of buses 208a-n.

Figure 4B:
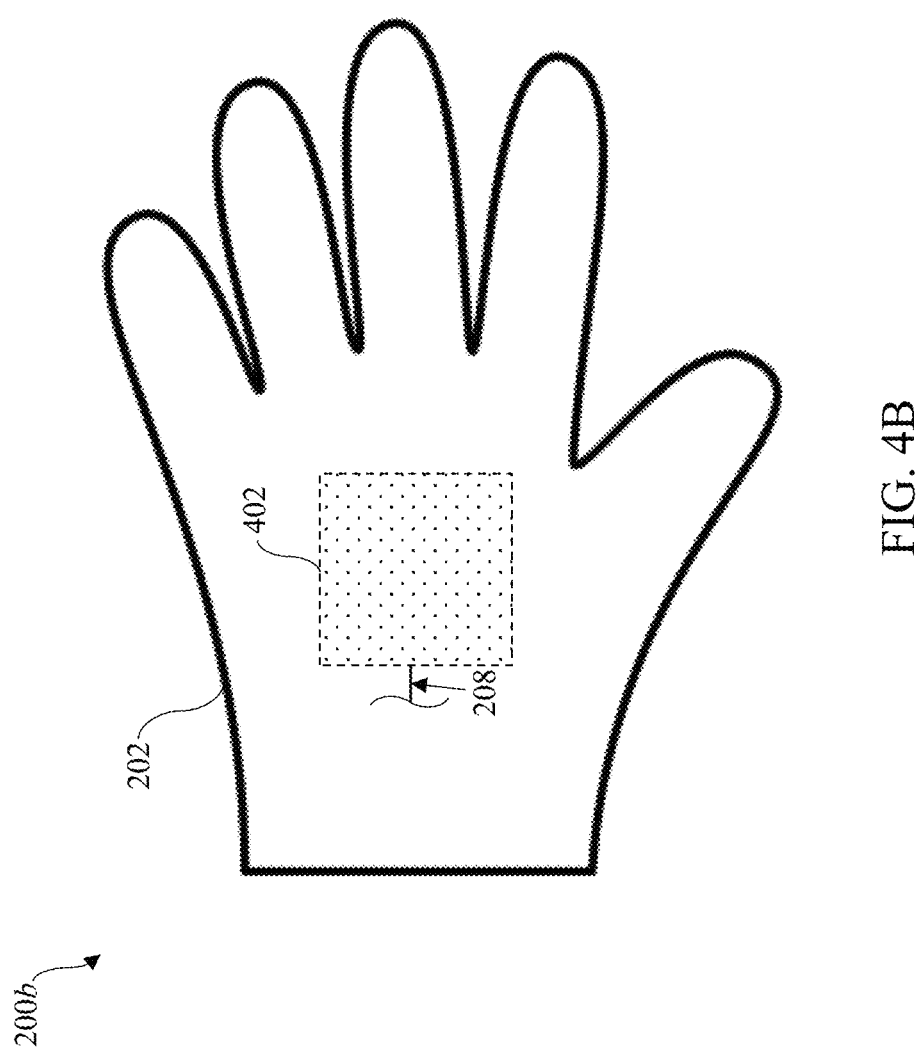
FIG. 4B is a plan view of an alternative embodiment of a wearable haptic feedback apparatus, in accordance with certain aspects of the present disclosure.

Referring now to FIG. 4B, a plan view of a wearable haptic feedback apparatus 200b is shown. In accordance with certain aspects of the present disclosure, wearable haptic feedback apparatus 200b comprises an embodiment of wearable haptic feedback apparatus 200, as shown and described in FIG. 2. FIG. 4B illustrates a top-down plan view of apparatus 200b. In accordance with certain embodiments, apparatus 200b comprises an acoustic material 402 disposed on, or embedded within, a surface of wearable garment 202. The acoustic material 402 may comprise a piezoelectric material configured to convert arriving acoustic waves into electrical signals. These types of materials are known in the art and need not be discussed at length here for the purposes of brevity. The acoustic material 402 may be communicably engaged with the controller (not shown) of apparatus 200b via at least one bus 208.

Figure 5:
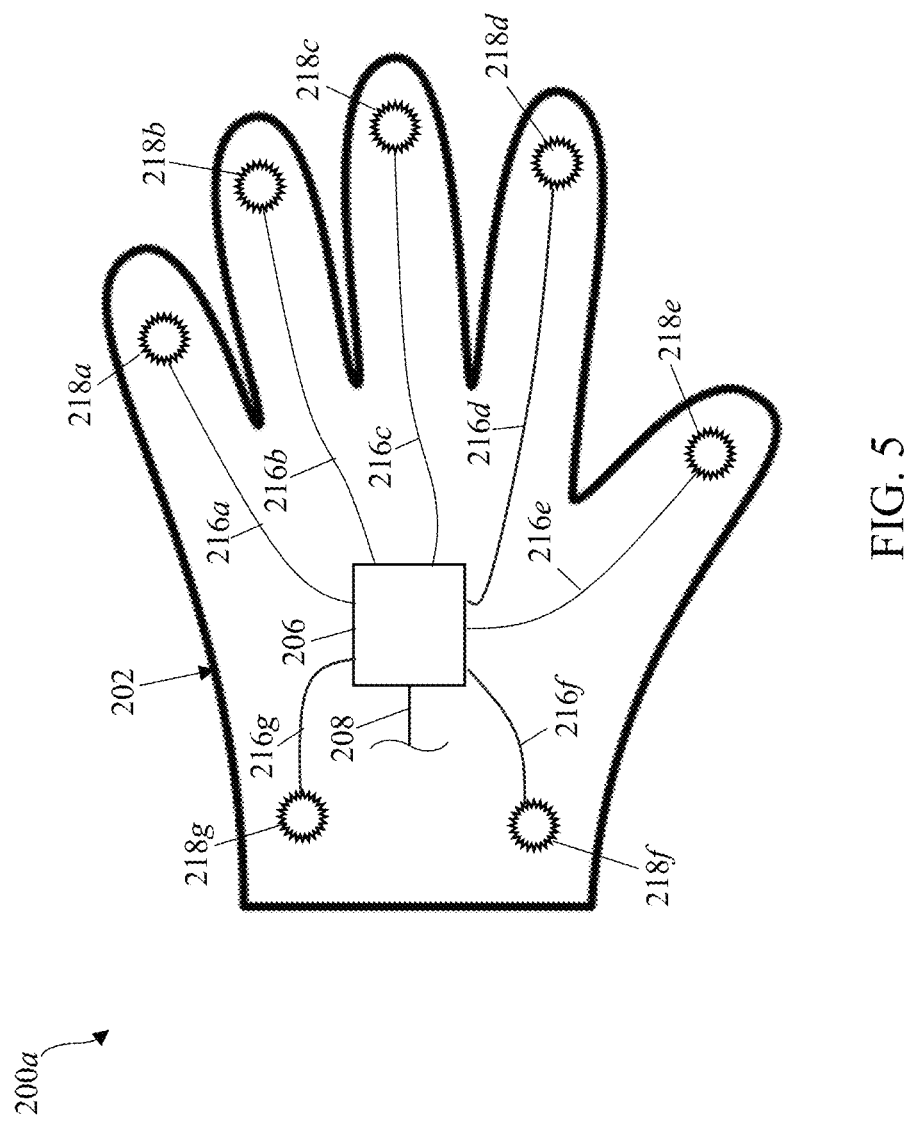
FIG. 5 is an internal view of a wearable haptic feedback apparatus, in accordance with certain aspects of the present disclosure.

Referring now to FIG. 5, a component view of wearable haptic feedback apparatus 200a is shown. In accordance with certain aspects of the present disclosure, FIG. 5 illustrates an internal area of wearable garment 202. For example, the components shown in FIG. 5 may be covered by one or more pieces of fabric when wearable garment 202 is worn by the user. As shown in FIG. 5, apparatus 200a may comprise controller 206, bus 208, and a plurality of vibrational motors 218a-g. Each motor in the plurality of vibrational motors 218a-g may be positioned at a different location in wearable garment 202. For example, as shown in FIG. 5, a first vibrational motor 218a may be located at a first finger portion of wearable garment 202; a second vibrational motor 218b may be located at a second finger portion of wearable garment 202; a third vibrational motor 218c may be located at a third finger portion of wearable garment 202; a fourth vibrational motor 218d may be located at a fourth finger portion of wearable garment 202; a fifth vibrational motor 218e may be located at a thumb portion of wearable garment 202; a sixth vibrational motor 218f may be located at a first wrist portion of wearable garment 202; and a seventh vibrational motor 218g may be located at a second wrist portion of wearable garment 202. In accordance with certain embodiments, the plurality of vibrational motors 218a-g may be operably engaged with controller 206 via a plurality of conductive wires 216a-g. In certain embodiments, the plurality of conductive wires 216a-g may be sewn or woven into a fabric of wearable garment 202.

Figure 6:
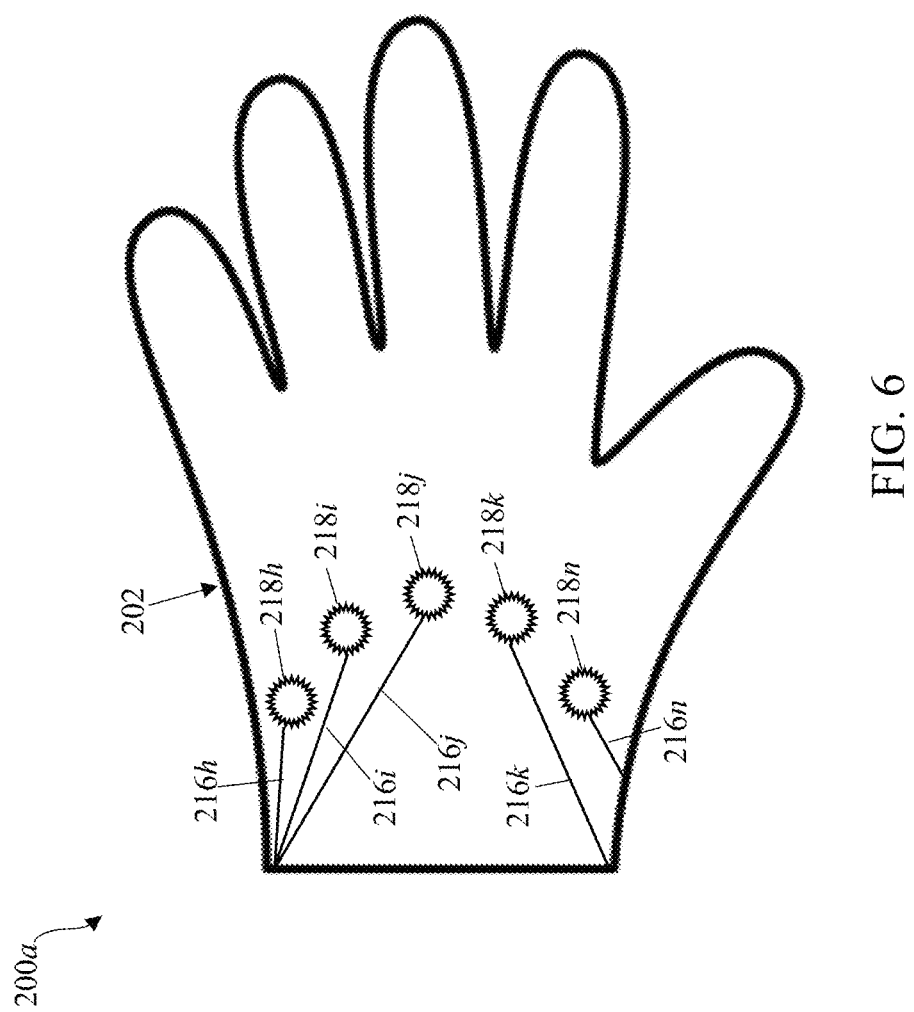
FIG. 6 is a plan view of a wearable haptic feedback apparatus, in accordance with certain aspects of the present disclosure.

Referring now to FIG. 6, a plan view of wearable haptic feedback apparatus 200a is shown. In accordance with certain aspects of the present disclosure, FIG. 6 illustrates a bottom plan view (i.e., a palm portion) of apparatus 200a. In accordance with certain embodiments, apparatus 200a comprises a plurality of vibrational motors 218h-n. Each motor in the plurality of vibrational motors 218h-n may be positioned at a different location on wearable garment 202. For example, as shown in FIG. 6, vibrational motor 218h may be located at a first palm portion of wearable garment 202; vibrational motor 218i may be located at a second palm portion of wearable garment 202; vibrational motor 218j may be located at a third palm portion of wearable garment 202; vibrational motor 218k may be located at a fourth palm portion of wearable garment 202; and vibrational motor 218n may be located at a fifth palm portion of wearable garment 202. In accordance with certain embodiments, the plurality of vibrational motors 218h-n may be operably engaged with controller 206 (as shown in FIG. 5) via a plurality of conductive wires 216h-n. In certain embodiments, the plurality of conductive wires 216h-n may be sewn or woven into a fabric of wearable garment 202.

Figure 7:
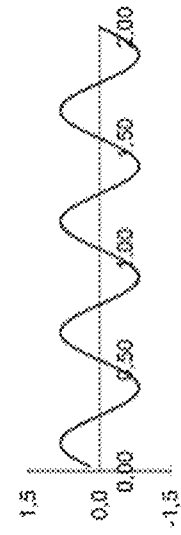
FIG. 7 illustrates plots of different vibrational patterns that may be generated by a wearable haptic feedback apparatus, in accordance with certain aspects of the present disclosure.
Figure 7:
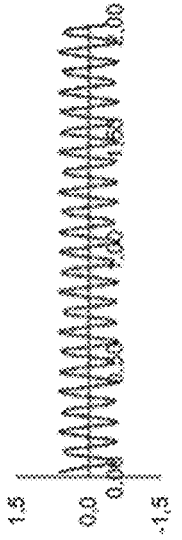
Figure 7:
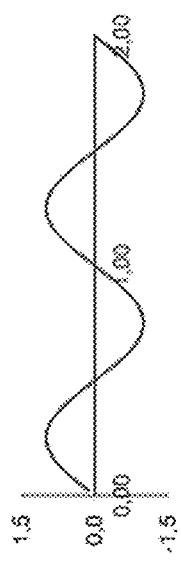
Figure 7:
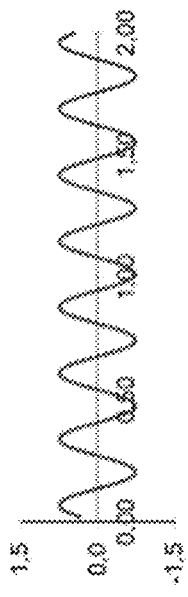

Referring now to FIG. 7, the figure illustrates plots of different vibrational patterns for a wearable haptic feedback apparatus (i.e., wearable haptic feedback apparatus 200 as shown and described in FIG. 2). In accordance with certain aspects of the present disclosure, apparatus 200 (as shown and described in FIG. 2) is configured to generate a vibrational output (e.g., as described herein) according to one or more vibrational pattern, sequence, intensity and duration. In accordance with certain aspects of the present disclosure, the one or more vibrational pattern, sequence, intensity and duration is configured according to the plurality of characteristics of a musical composition (e.g., musical notes, beat/rhythm, etc.). For example, if the musical composition comprises a sequence of notes "A-B-C-D," then apparatus 200 (as shown and described in FIG. 2) may be configured to generate a first vibrational output according to a first pattern (e.g., "Vibrational Pattern 1") associated with note "A," followed by a second vibrational output according to a second pattern (e.g., "Vibrational Pattern 2") associated with note "B," followed by a third vibrational output according to a third pattern (e.g., "Vibrational Pattern 3") associated with note "C," followed by a fourth vibrational output according to a fourth pattern (e.g., "Vibrational Pattern 4") associated with note "D." Additionally, if the musical composition is such that note "A" is present for four beats, note "B" is present for two beats, note "C" is present for four beats, and note "D" is present for two beats, then apparatus 200 (as shown and described in FIG. 2) may be configured to generate Vibrational Pattern 1 for four beats, Vibrational Pattern 2 for two beats, Vibrational Pattern 3 for four beats, and Vibrational Pattern 4 for two beats.

Figure 8:
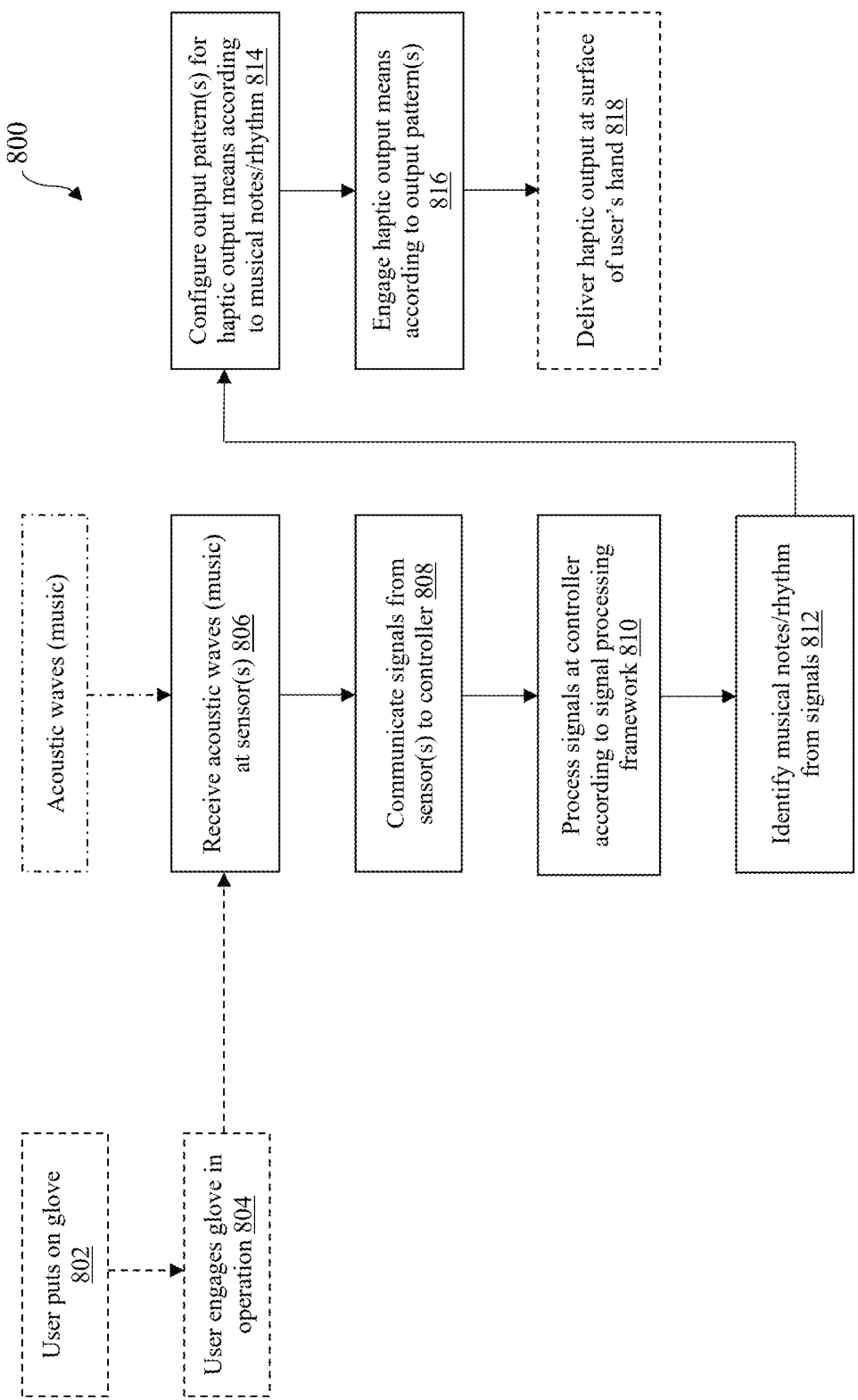
FIG. 8 is a process flow diagram for operations of a wearable haptic feedback apparatus, in accordance with certain aspects of the present disclosure.

Referring now to FIG. 8, a process flow diagram of an operational routine 800 of a wearable haptic feedback apparatus is shown. In accordance with certain aspects of the present disclosure, the wearable haptic feedback apparatus may comprise wearable haptic feedback apparatus 200, as shown and described in association with FIG. 2. In accordance with certain aspects of the present disclosure, routine 800 may be performed in the order presented, in a different order, or simultaneously. Further, in some exemplary embodiments, some of the operations may be omitted, added, modified, skipped, or the like without departing from the scope of the invention.

In accordance with certain aspects of the present disclosure, routine 800 may be initiated upon a user putting on the wearable haptic feedback apparatus (i.e., glove) (Step 802) and the user engaging the glove in at least one mode of operation (Step 804). In certain embodiments, Step 804 may comprise the user selecting/engaging a user interface for the apparatus. Routine 800 may proceed by performing one or more steps or operations for receiving incoming acoustic waves at one or more acoustics sensors of the apparatus (Step 806). In accordance with certain aspects of the present disclosure, the incoming acoustic waves are associated with a live or recorded musical composition. Routine 800 may proceed by performing one or more steps or operations for communicating a plurality of signals (e.g., in real-time) from the one or more acoustic sensors to a controller of the apparatus (Step 808). Routine 800 may proceed by performing one or more steps or operations for processing (e.g., in real-time) the plurality of signals at the controller of the apparatus according to a signal processing framework (Step 810). Routine 800 may proceed by performing one or more steps or operations for identifying and extracting (e.g., according to the signal processing framework) a plurality of musical characteristics for the musical composition from the plurality of signals (Step 812). The plurality of musical characteristics for the musical composition may include, for example, musical notes, chords, rhythm, tempo, intensity, etc. Routine 800 may proceed by performing one or more steps or operations for configuring one or more output patterns for one or more haptic output means according to the identified plurality of musical characteristics for the musical composition (Step 814). Routine 800 may proceed by performing one or more steps or operations for engaging the one or more haptic output means according to the one or more output patterns (Step 816) to deliver a haptic output (e.g., vibrational output) at the surface of the user's hand (or other body part) (Step 818).

Figure 9:
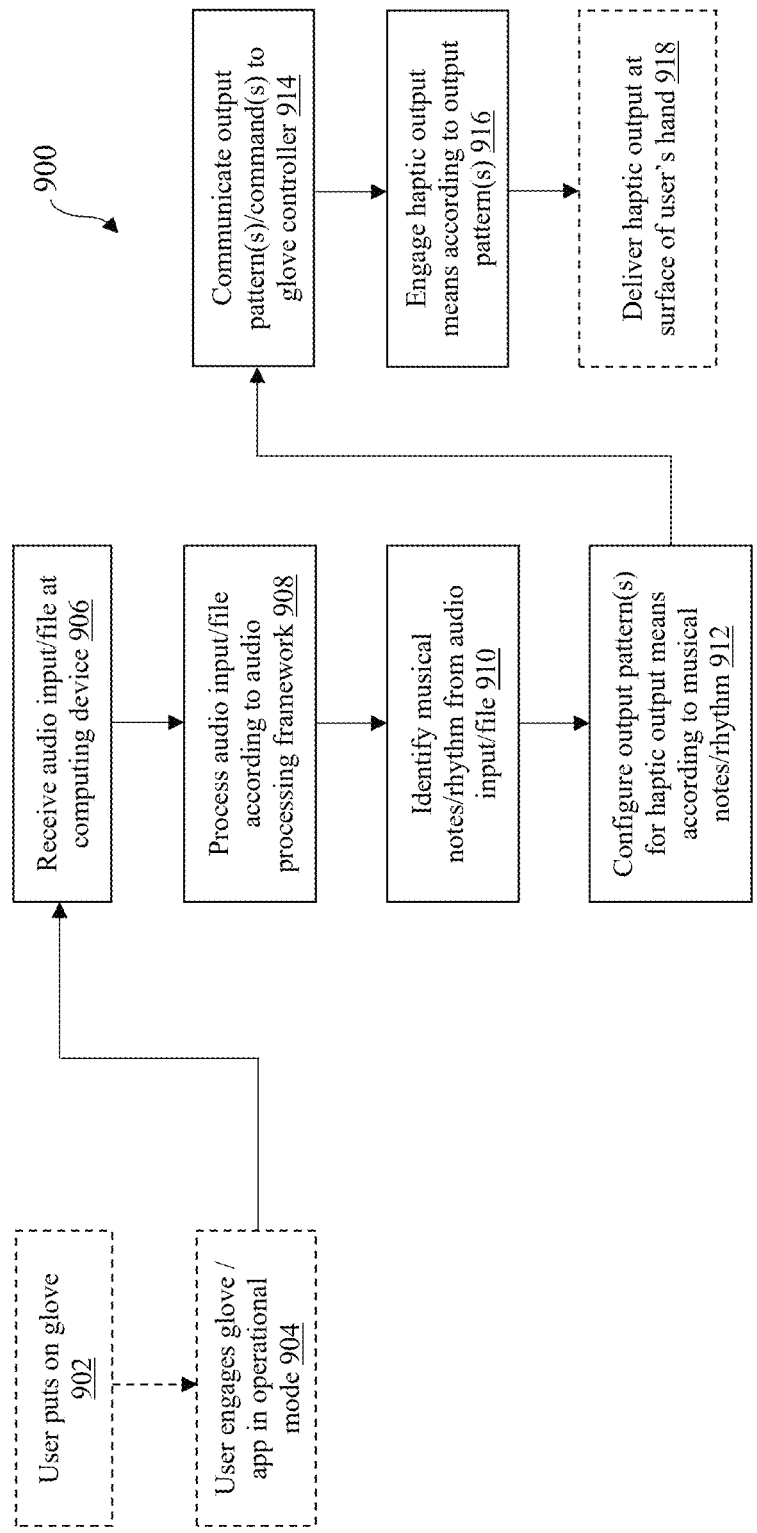
FIG. 9 is a process flow diagram for operations of a wearable haptic feedback apparatus, in accordance with certain aspects of the present disclosure.

Referring now to FIG. 9, a process flow diagram of an operational routine 900 for a wearable haptic feedback system is shown. In accordance with certain aspects of the present disclosure, the wearable haptic feedback system may comprise wearable haptic feedback system 300, as shown and described in association with FIG. 3. In accordance with certain aspects of the present disclosure, routine 900 may be performed in the order presented, in a different order, or simultaneously. Further, in some exemplary embodiments, some of the operations may be omitted, added, modified, skipped, or the like without departing from the scope of the invention.

In accordance with certain aspects of the present disclosure, routine 900 may be initiated upon a user putting on the wearable haptic feedback apparatus (i.e., glove) (Step 902) and the user engaging the glove in at least one mode of operation and, optionally, launch an instance of an end user mobile application at a computing device (Step 904). In certain embodiments, Step 904 may comprise the user interacting with at least one user interface at the apparatus and/or the instance of the mobile application. Routine 900 may proceed by performing one or more steps or operations for receiving an audio input and/or file at the computing device (Step 906). The audio input may be received via at least one microphone communicably engaged with the computing device and/or the audio input may be received as a pre-recorded audio file. Routine 900 may proceed by performing one or more steps or operations for processing the audio input/file according to an audio processing framework (Step 908). Routine 900 may proceed by performing one or more steps or operations for identifying and extracting (e.g., according to the audio processing framework) a plurality of musical characteristics for the musical composition from the audio input and/or file (Step 910). The plurality of musical characteristics for the musical composition may include, for example, musical notes, chords, rhythm, tempo, intensity, etc. Routine 900 may proceed by performing one or more steps or operations for configuring (e.g., as processor-executable instructions) one or more output patterns for one or more haptic output means of the wearable haptic feedback apparatus according to the identified plurality of musical characteristics for the musical composition (Step 912). Routine 900 may proceed by performing one or more steps or operations for communicating the one or more output patterns (e.g., as processor-executable instructions) for the one or more haptic output means to a controller of the wearable haptic feedback apparatus (Step 914). Routine 900 may proceed by performing one or more steps or operations for engaging (e.g., via the controller of wearable haptic feedback apparatus) the one or more haptic output means according to the one or more output patterns (Step 916) to deliver a haptic output (e.g., vibrational output) at the surface of the user's hand (or other body part) (Step 918).

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

Any publications discussed herein are provided solely for their disclosure prior to the filing date of the present application. Nothing herein is to be construed as an admission that the present invention is not entitled to antedate such publication by virtue of prior invention. Further, the dates of publication provided may differ from the actual publication dates which may need to be independently confirmed.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general-purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational phases to be performed on the computer or other programmable apparatus to produce a computer-implemented process such that the code portions which execute on the computer or other programmable apparatus provide phases for implementing the functions/acts specified in the flowchart and/or block diagram block(s). Alternatively, computer program implemented phases or acts may be combined with operator or human implemented phases or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that phases of the processes described herein may be performed in orders different than those illustrated in the flowcharts. In other words, the processes represented by the blocks of a flowchart may, in some embodiments, be performed in an order other than the order illustrated, may be combined or divided, or may be performed simultaneously. It will also be understood that the blocks of the block diagrams illustrate, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While certain exemplary embodiments have been described and shown in the accompanying drawings, it is to be understood that such embodiments are merely illustrative of, and not restrictive on, the broad invention, and that this invention is not limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. An apparatus comprising:
   a supporting structure comprising a fabric material configured to be placed in proximity to a body part of a user;
   a means for sensing an acoustic wave disposed on at least one surface of the supporting structure or embedded in the supporting structure;
   a controller communicably engaged with the means for sensing the acoustic wave via at least one bus,
   wherein the means for sensing the acoustic wave is configured to provide a plurality of signals to the controller in real-time in response to sensing a plurality of acoustic waves, wherein the plurality of acoustic waves comprises an acoustic input;
   at least one vibrational motor operably engaged with the controller,
   wherein the at least one vibrational motor is disposed on a surface of the supporting structure or embedded in the supporting structure,
   wherein the at least one vibrational motor is configured to generate a vibrational output in response to a control signal from the controller; and
   a power source operably engaged with the controller and the at least one vibrational motor to provide a flow of power thereto,
   wherein the controller is configured to selectively engage the at least one vibrational motor according to at least eight vibrational patterns,
   wherein each vibrational pattern in the at least eight vibrational patterns is different,
   wherein each vibrational pattern in the at least eight vibrational patterns corresponds to a different musical note on a scale,
   wherein the controller is configured to process the acoustic input in real-time to identify a first musical note for a first duration and a second or subsequent musical note for a second or subsequent duration,
   wherein the controller is configured to engage the at least one vibrational motor in real-time according to a first vibrational pattern in the at least eight vibrational patterns according to the first musical note for the first duration and engage the at least one vibrational motor according to a second or subsequent vibrational pattern in the at least eight vibrational patterns corresponding to the second or subsequent musical note for the second or subsequent duration.

2. The apparatus of claim 1 wherein the controller comprises a wireless communications chipset.

3. The apparatus of claim 1 wherein the at least one bus comprises at least one conductive wire embedded in the supporting structure.

4. The apparatus of claim 1 wherein the supporting structure is configured as a glove.

5. The apparatus of claim 1 wherein the means for sensing the acoustic wave comprises a piezoelectric material.

6. The apparatus of claim 5 wherein the piezoelectric material is configured to convert arriving acoustic waves into electrical signals.

7. The apparatus of claim 1 wherein the means for sensing the acoustic wave comprises one or more acoustic transducers.

8. The apparatus of claim 1 further comprising a plurality of vibrational motors.

9. The apparatus of claim 8 wherein each vibrational motor in the plurality of vibrational motors is positioned at a different location on the supporting structure.

10. An apparatus comprising:
a supporting structure configured to be placed in proximity to a body part of a user;
a means for sensing an acoustic wave disposed on at least one surface of the supporting structure or embedded in the supporting structure;
a controller communicably engaged with the means for sensing the acoustic wave,
wherein the means for sensing the acoustic wave is configured to provide a plurality of signals to the controller in real-time in response to sensing a plurality of acoustic waves, wherein the plurality of acoustic waves comprises an acoustic input;
a haptic feedback means operably engaged with the controller,
wherein the haptic feedback means is configured to generate a haptic output at one or more locations of the body part of the user in response to a control signal from the controller; and
a power source operably engaged with the controller and the haptic feedback means to provide a flow of power thereto,
wherein the controller is configured to selectively engage the haptic feedback means according to at least eight haptic output patterns,
wherein each haptic output pattern in the at least eight haptic output patterns is different,
wherein each haptic output pattern in the at least eight haptic output patterns corresponds to a different musical note on a scale,
wherein the controller is configured to process the acoustic input in real-time to identify a first musical note for a first duration and a second or subsequent musical note for a second or subsequent duration,
wherein the controller is configured to engage the haptic feedback means in real-time according to a first haptic output pattern corresponding to the first musical note for the first duration and engage the haptic feedback means according to a second or subsequent haptic output pattern corresponding to the second or subsequent musical note for the second or subsequent duration.

11. The apparatus of claim 10 wherein the controller comprises a wireless communications chipset.

12. The apparatus of claim 10 wherein the supporting structure is configured as a glove.

13. The apparatus of claim 10 wherein the means for sensing the acoustic wave comprises a piezoelectric material.

14. The apparatus of claim 13 wherein the piezoelectric material is configured to convert arriving acoustic waves into electrical signals.

15. The apparatus of claim 10 wherein the means for sensing the acoustic wave comprises one or more acoustic transducers.

16. A system comprising:
a supporting structure comprising a fabric material configured to be placed in proximity to a body part of a user;
a means for sensing an acoustic wave disposed on at least one surface of the supporting structure or embedded in the supporting structure;
a controller communicably engaged with the means for sensing the acoustic wave via at least one bus,
wherein the means for sensing the acoustic wave is configured to provide at least one signal to the controller in response to sensing one or more acoustic waves; and
at least one vibrational motor operably engaged with the controller,
wherein the at least one vibrational motor is configured to generate a vibrational output in response to a control signal from the controller;
wherein the controller is configured to selectively engage the at least one vibrational motor according to at least eight vibrational patterns,
wherein each vibrational pattern in the at least eight vibrational patterns is different,
wherein each vibrational pattern in the at least eight vibrational patterns corresponds to a different musical note on a scale,
wherein the controller is configured to process an acoustic input in real-time to identify a first musical note for a first duration and a second or subsequent musical note for a second or subsequent duration,
wherein the controller is configured to engage the at least one vibrational motor in real-time according to a first vibrational pattern corresponding to the first musical note for the first duration and engage the at least one vibrational motor according to a second or subsequent vibrational pattern corresponding to the second or subsequent musical note for the second or subsequent duration; and
a computing device communicably engaged with the controller via a data transfer interface,
wherein the computing device is configured to command one or more operations of the controller.

17. The system of claim 16 wherein the supporting structure is configured as a glove.

18. The system of claim 16 wherein the means for sensing the acoustic wave comprises a piezoelectric material.

19. The system of claim 18 wherein the piezoelectric material is configured to convert arriving acoustic waves into electrical signals.

20. The system of claim 16 wherein the means for sensing the acoustic wave comprises one or more acoustic transducers.

* * * * *